United States Patent [19]

White

[11] 4,331,204
[45] May 25, 1982

[54] TILLAGE IMPLEMENT

[76] Inventor: Robert E. White, 632 W. Commerce Ave., Gilbert, Ariz. 85234

[21] Appl. No.: 132,377

[22] Filed: Mar. 21, 1980

[51] Int. Cl.³ .................. A01B 33/02; A01B 33/12; A01B 49/02; A01B 49/06
[52] U.S. Cl. ............................ 172/70; 172/72; 172/78; 172/112; 172/119
[58] Field of Search .................. 172/70, 71, 72, 76, 172/77, 78, 112, 119, 123, 699, 701, 703, 704, 719, 753; 175/383; 299/91

[56] References Cited

U.S. PATENT DOCUMENTS

| | | | |
|---|---|---|---|
| 1,476,917 | 12/1923 | Patitz | 172/119 X |
| 2,582,364 | 1/1952 | Tice | 172/112 X |
| 2,627,712 | 2/1953 | Chatten | 172/63 X |
| 2,691,933 | 10/1954 | Emerson | 172/76 X |
| 2,795,176 | 6/1957 | O'Hara | 172/112 X |
| 3,041,752 | 7/1962 | Evans | 172/753 X |
| 3,128,833 | 4/1964 | Johnson et al. | 172/701 X |
| 3,187,822 | 6/1965 | Clifford et al. | 172/701 |
| 3,224,347 | 12/1967 | Seaman | 172/112 X |
| 3,453,756 | 7/1969 | Schroeder | 175/383 X |
| 3,655,244 | 4/1972 | Swisher | 299/91 |
| 3,693,722 | 9/1972 | Brown | 172/72 X |
| 3,737,199 | 6/1973 | Stephenson | 172/123 X |
| 3,822,656 | 7/1974 | Lalor | 172/63 X |
| 4,013,130 | 3/1977 | Wirt et al. | 172/719 |
| 4,088,083 | 5/1978 | Dail, Jr. et al. | 172/72 X |
| 4,199,030 | 4/1980 | Chance | 172/72 X |
| 4,214,633 | 7/1980 | Jackson et al. | 299/91 X |

FOREIGN PATENT DOCUMENTS

| | | | |
|---|---|---|---|
| 252712 | 1/1963 | Australia | 172/123 |
| 2755676 | 6/1969 | Fed. Rep. of Germany | 172/70 |
| 2515767 | 10/1975 | Fed. Rep. of Germany | 172/70 |
| 2823625 | 12/1978 | Fed. Rep. of Germany | 172/112 |
| 693077 | 6/1953 | United Kingdom | 172/123 |
| 856630 | 12/1960 | United Kingdom | 172/72 |
| 2025192 | 1/1980 | United Kingdom | 172/112 |
| 457438 | 3/1975 | U.S.S.R. | 172/112 |

Primary Examiner—Paul E. Shapiro
Attorney, Agent, or Firm—Cahill, Sutton & Thomas

[57] ABSTRACT

A tractor drawn tillage implement having a front hood, rippers, a rotary tiller and a row former, conditions tight adobe soil ready for planting in one pass. The front hood, having rock deflectors, protects the operator from airborne objects while containing dust and soil disturbed by the rippers and the tiller. The rippers fracture the soil to aid water and root penetration, to increase water retention of the subsoil and to constrain development of hard pan. The rotatary tiller, driven by an auxiliary power unit and having its axis of rotation at or submerged below the ground surface, mulches the soil and plant residue and aerates the soil commensurate with rearward airborne discharge of the soil. A row former deflects the airborne soil into rows of predetermined height and width ready for planting and provides an air tight shroud to control dust and airborne objects. A tool bar is also incorporated for supporting add ons, such as fertilizers and planters.

15 Claims, 3 Drawing Figures

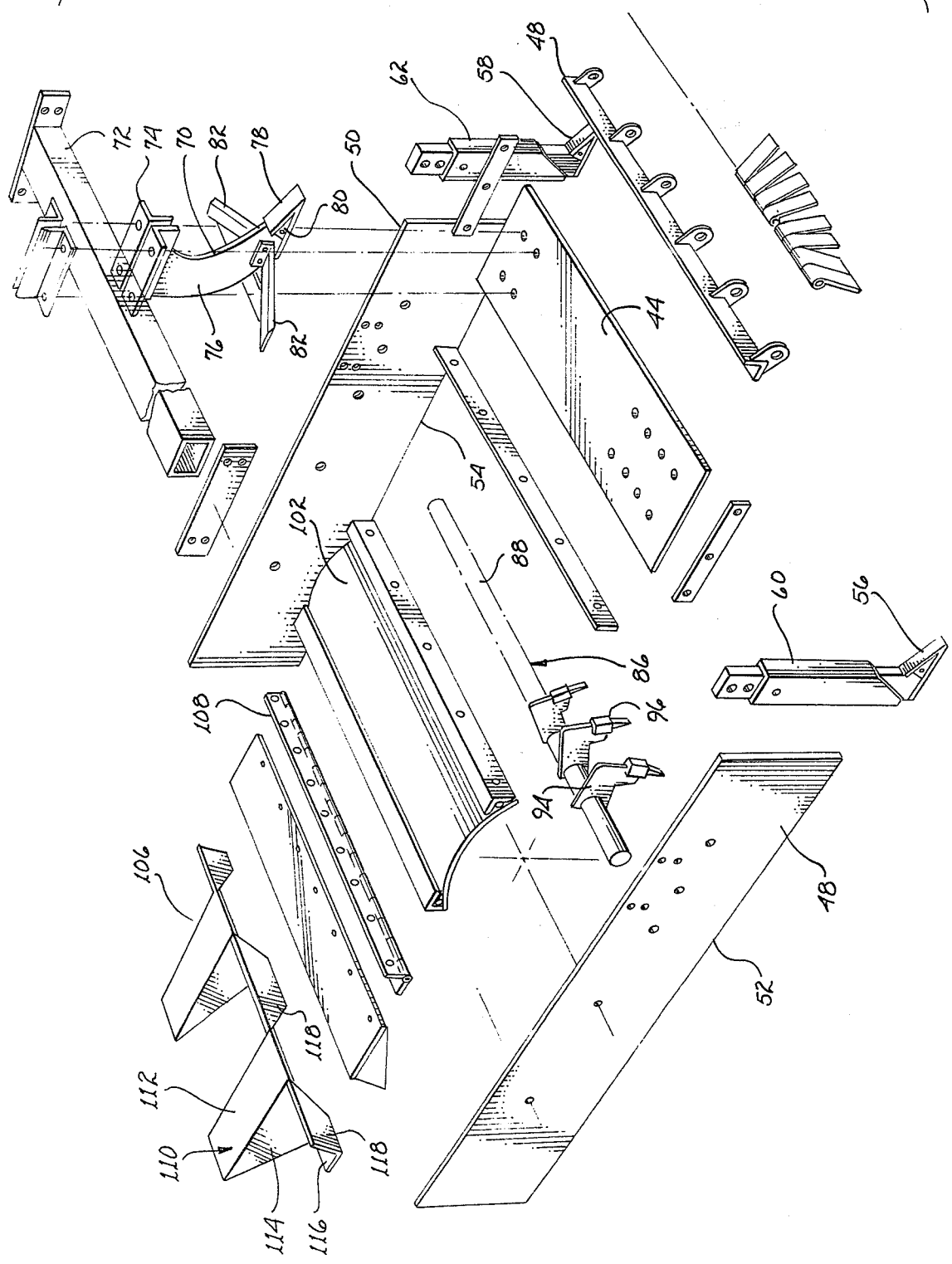

TILLAGE IMPLEMENT

The present invention relates to farming equipment and, more particularly, to apparatus for conditioning soil for planting.

To condition farm acreage ready for planting, the following operations must be conducted. Any stalks present from the previous season's crop must be cut. Surface crusting and any ground cover growth is broken up by prediscing. The ground is ripped to fracture it to obtain water and root penetration. The ground is plowed to turn under crop residue and preserve existing nutrients. Discing is necessary to overcome the compacting effect of the previous passes by vehicles and break up the large clods left by plowing. After discing, the ground should be leveled to smooth out the surface rearrangement from plowing and discing. In preparation for planting, the field is furrowed.

In accordance with present farming practices, each of the above operations requires a pass across the field by a tractor pulling an implement for accomplishing each particular operation. In severe hard clay areas several discing operations may have to be performed. Certain soil texture conditions and certain crops may permit deletion of one or more of the above identified operations, the costs, in terms of implements needed, labor and time to condition a field ready for planting is very substantial.

Various devices have been developed over the years to combine two or more of the operations and reduce the cost and increase the efficiency in conditioning a field. Some of these devices are adequate and useful primarily only in areas which are not irrigated and in areas having rich loamy soil.

U.S. Pat. No. 1,145,147, issued in 1915, depicts a rotary plow having a plurality of ganged blades mounted at the periphery of a rotatable disc having an axis of rotation substantially above the ground surface. Rotation of the disc is achieved through a power take off unit located at the vehicle drawing the implement across the ground. The blades are pivotally mounted at the perimeter of the disc. The disc includes means for pivotally retracting the blades when they reached the bottom dead center to prevent discharge of the soil from the transverse furrow formed.

U.S. Pat. No. 1,383,761 is directed to a rotary digging machine having three equiangularly oriented blades radial to the axis of rotation. Spring means are disposed intermediate the blades and the driving axle to lessen impact forces on the axle. A further rotary soil working implement is disclosed in U.S. Pat. No. 2,515,268 wherein a plurality of tines extend from each of a plurality of supporting plates mounted upon a rotating shaft. The axis of rotation is substantially above the ground surface and a shroud is employed to restrain but not inhibit flight of airborne soil particles. A soil conditioner is described in U.S. Pat. No. 2,736,254 wherein a plurality of sprung tines extend radially from a supporting disc mounted upon a rotating shaft. A shroud encloses the rotating tines and attempts to re-establish the surface level of the conditioned soil to its original level.

U.S. Pat. No. 2,669,919 is directed to a rotary plow for barely breaking the ground surface with a plurality of teeth extending from each station along a rotating shaft. Vegetation cutting blades interleave each of the sets of teeth whereby existing vegetation is severed from the ground and shredded. A partial shroud tends to restrain discharge or airborne soil and vegetation particles.

While each of the above referenced patents performs a soil conditioning function, several problems remain. Those implements which employ a shroud as a deflector for airborne dirt particles will quickly wear out through the abrasive action of the soil. By employing closely spaced and a large number of tines or teeth, the soil becomes pulverized, as intended, which condition is totally unacceptable in adobe soil as it disturbs the beneficial functions of micro-organisms contained therein and will quickly cause complete drying of the subsoil. Moreover, fine pulverizing of the soil will seal the ground and prevent penetration of water and will create a dust problem. Having the axis of rotation disposed at a point above the ground increases the moment arm of the blades unnecessarily and requires excessive power for adequate torque. Finally, any of the above identified implements only accomplish two of the above seven recited operations which necessitates multiple passes by other implements in order to prepare the ground for planting.

It is therefore a primary object of the present invention to provide a tillage implement for completely preparing soil ready for planting in one pass.

Another object of the present invention is to provide a tillage implement particularly suitable to satisfy the harsh requirements attendant the farming of adobe soil.

Yet another object of the present invention is to provide a tillage implement which thoroughly conditions the soil and yet retains the existing moisture content and aerobic bacterial action within the soil.

Still another object of the present invention is to provide fracture, top soil mixing and row formation of the soil in one pass.

A further object of the present invention is to provide a tillage implement which creates little, if any, dust while conditioning dust prone adobe soil.

A yet further object of the present invention is to minimize wear on row forming surfaces by employing the soil itself as a buffer against which airborne soil particles are discharged.

A still further object of the present invention is to provide a controlled flow path of the soil being tilled by a rotary tiller to permit the axis of rotation to be at or below the ground surface without creating wear on the shaft and without jeopardizing the integrity of the bearings supporting the shaft.

A still further object of the present invention is to provide a flow path for the soil being tilled by a rotary tiller to permit the shaft supporting the mulching teeth to be at or below the ground surface and reduce the torque load imposed thereon by permitting short arms to support the teeth and yet obtain sufficient soil conditioning depth.

A still further object of the present invention is to provide an auxiliary power unit for rotating a rotatable tiller used in conjunction with rippers and a row forming device and limit the load upon the draft vehicle commensurate only with that imposed by the rippers and row forming elements.

A still further object of the present invention is to provide a soil conditioning implement to which are attachable planters and/or fertilizers for complete soil conditioning, planting and fertilizing in one pass.

These and other objects will become apparent to those skilled in the art as the description of the present invention proceeds.

The present invention will be described with greater specificity and clarity with reference to the following figures, in which:

FIG. 3 is an exploded isometric view of the elements of the present invention.

Figure 1:
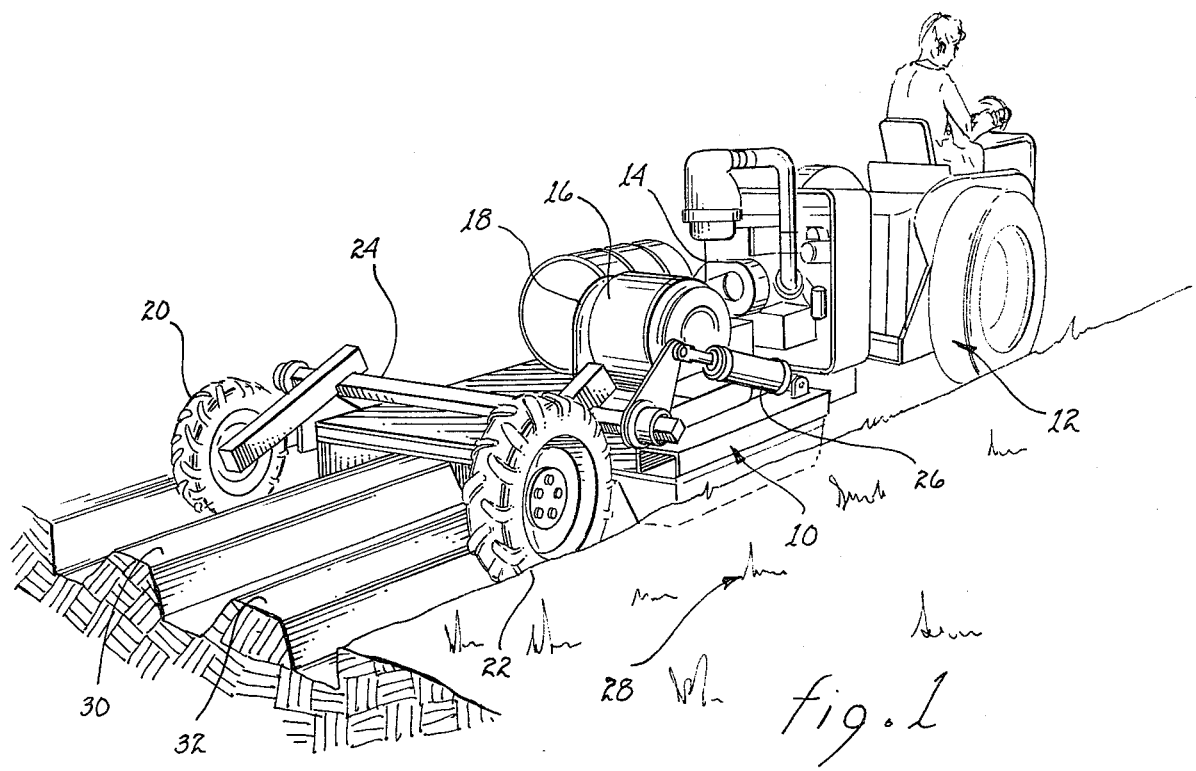
FIG. 1 illustrates the employment of the present invention in a field to be tilled.

Referring to FIG. 1, there is illustrated a tillage implement 10 constructed in accordance with the teachings of the present invention and drawn by a motive power unit, such as tractor 12. The tillage implement includes rippers to fracture the soil, a rotating tiller to mulch the soil and plant residue and aerate the soil commensurate with rearward airborne discharge of the soil and a row former for deflecting the airborne soil into rows of predetermined height and width ready for planting. Means for controlling air flow in and about the tillage implement are incorporated to prevent dust contamination and discharge therefrom of airborne objects. A power unit 14, mounted upon tillage implement 10, provides power to the rotary tiller through a transmission 16 and chain drive 18. Forward motion of the tillage implement, along with the requisite power for the rippers and the row former, are provided by tractor 12. Trailing wheels 20, 22 are secured to pivotable shaft 24. A hydraulic system 26, powered by either power unit 14 or tractor 12, may be actuated to rotate shaft 24 and raise or lower the wheels with respect to tillage implement 10 or transport of the tillage implement above ground.

As will be explained in detail below, tillage implement 10 is useable in a farm field 28 which may have crop residue from the previous season as well as any vegetation and ground cover growth. By one pass of the tillage implement, the soil is fractured to a depth below any hard pan that may have developed, approximately seven to eight inches of top soil, is tilled and rows 30 and 32 are formed. These rows are ready for fertilizing, planting, etc. Although not illustrated in detail, it is to be understood that a conventional hitch tool bar 34 (see FIG. 2) may be attached to the rear of tillage implement 10. Such a tool bar would serve as the attachment point for any commercially available fertilizers, planters, etc. Were these ancillary items attached to the tillage implement, all soil conditioning steps, fertilizing and planting could be accomplished by a single pass across farm field 28.

Tillage implement 10 will be described in detail with joint reference to FIGS. 2 and 3. Framework 40 includes a tow bar 42 for detachable attachment to tractor 12. The framework also supports power unit 14, transmission 16 and chain drive unit 18. A front hood 44 of one eighth inch carbon steel plate is disposed beneath and attached to framework 40. The front hood serves as a safety shield to prevent discharge of airborne objects from within the tillage implement toward an operator on the tractor or any bystanders. A plurality of rock deflectors 46 are pivotally suspended from a mounting 48 disposed along the forward edge of the front hood. These rock deflectors trail along farm field 28 and automatically conform with any changes in elevation thereof. End plates 48 and 50 depend from framework 40 lateral thereto and define the lateral boundaries of the tillage implement. As particularly illustrated in FIG. 2, lower edges 52 and 54 of the end plates extend beneath the surface of farm field 28. These end plates serve primarily to prevent lateral discharge of earth particles and as a dust seal. In one embodiment of the present invention, the end plates extended five inches (5") below the surface and approximately two inches (2") above the swath being cut by the rotary tiller. Since the end plates extend beneath the surface of the ground, rippers 56 and 58 are employed to fracture the ground in front of the end plates and provide a path through the ground for them. These rippers are attached to and extend downwardly from framework 40 horizontally forwardly displaced from and in vertical alignment with the forward edge of the end plates. Sleeves 60 and 62 may be incorporated to enclose rippers 56 and 58, respectively, which sleeves provide for vertical adjustment of the rippers to permit them to extend below the lower edges of the end plates to a predetermined depth. Thereby, these rippers can serve a function fracturing the ground substantially below the end plates to aid the rotary tiller in performing its work. Moreover, root and moisture penetration of the soil is aided by ripping the farm field at the lateral extremities of the tillage implement.

In certain soil conditions and depending on the type of linkage employed between the implement and the draught vehicle, rippers 56 and 58 may not be necessary as the robustness of end plates 48 and 50 may be sufficient to cut a path through the ground. If these rippers are not employed, a forward facing tong or point is welded or otherwise attached to the front of each of the lower edges 52 and 54. These points extend forwardly of and depend downwardly from each respective leading edge. They penetrate any clods encountered and prevent the endplates from riding up and over the clods.

Figure 2:
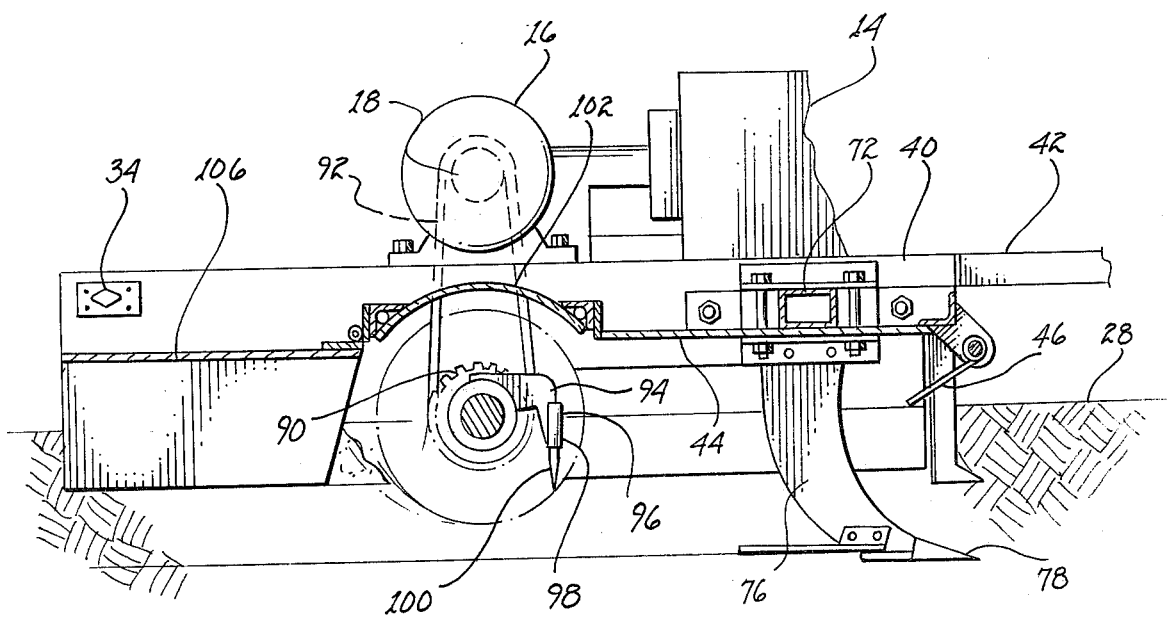
FIG. 2 is a partial cross-sectional view of the major operative elements of the present invention.

A plurality of rippers 70, of which only one is shown in FIGS. 2 and 3, are mounted to and depend from a tool bar 72 located at the forward end of framework 40 and in proximity to the upper surface of front hood 44. The means for attaching the rippers may include a plurality of tool bar clamps 74 of conventional construction and well known to those skilled in the art. Each ripper includes a standard 76, which standard may be slightly curved to reduce thrashing. Points 78 are detachably attached to the lower end of the standard. The means for detachably attaching the points may include conventional nut and bolt elements or tappered pins. Alternatively, points 78 may include a shoe 80 in frictional locked engagement with standard 76 to permit replacement of the points without the difficulties attendant to and possible loss of nuts, bolts or pins; or the shoe may be attached to the standard and the points may be in frictional engagement therewith. Weeder knives 82 are attached to standard 76 directly rearward of point 78 by nut and bolt means as a replacement of the weeder knives is usually not often required. In a variant of ripper 70, the weeder knives may be vertically adjustable to accommodate special or particular soil conditions.

The plurality of rippers 70 mounted upon tool bar 72 provide a plurality of vertical cuts spaced across the width of the tillage implement. These rippers fracture the soil ahead of the tiller to a depth significantly greater than that of the tiller to provide for good water and root penetration of the soil. Moreover, the vertical extension of the rippers prevents the development of a hard pan commensurate with the level to which the rotating tiller works the soil. Because of the use of individual clamps 74 to secure rippers 70 anywhere along tool bar 72, both the number and width of the cuts to be made by the rippers can be varied to comport with local soil conditions. Moreover, the length of weeder knives 82 is variable by simply replacing them with longer or shorter knives commensurate with the soil conditions and the spacing of the rippers.

Rotary tiller 86 includes a shaft 88 journaled within bosses attached to end plates 48 and 50 or within supporting structure depending from frame 40. A sprocket 90 is mounted approximately central to the shaft for engagement with a chain 92, which chain is a part of transmission 18. Thereby, rotation of shaft 88 is effected upon energization of power unit 14 and is independent of forward motion of the tillage implement. Each of a plurality of shanks 94 are fixed to shaft 88 in such a manner as to define a spiral path about the shaft. The radially inward end of the leading edge of each shank is at a trailing angle to discourage trash build up adjacent the junction of the shaft and shank. An experimental model had almost no wear on the point of the shaft, which demonstrates the shanks effectiveness in preventing trash build up.

A tapered shoe 96 oriented essentially perpendicular to a radial of shaft 88 is affixed to the extremity of each shank. The shoe includes a tapered recess 98 for engagingly receiving one end of a point 100. The point may be tapered at each end so that either end of the point may be detachably secured in the tapered recess of shoe 96. With this configuration of point 100, both ends of the points may be used and the useful life of the points becomes twice that of conventional points. To change the operative end of each point or replace each point, it is simply withdrawn from within shoe 96 and turned end for end or replaced with a new point.

Where shredding of heavy vegetation is necessary, one end of points 100 may be blade shaped and extend in one or both opposed lateral directions into adjacent alignment or overlapping alignment with a blade extending from each adjacent shank. Moreover, the wear pattern on the points tends to wear the radial inward surface, which has the effect of keeping them sharp for better cutting.

Rotary tiller 86 is oriented to locate its axis of rotation at or about the surface of farm field 28. Thereby, the depth of soil tilled is a function of the distance from the center of shaft 88 to the tip of points 100. By lowering the axis of rotation of shaft 88 as disclosed rather than having the axis of rotation located substantially above the surface of the farm field as prior art teaches, the moment arm attendant points 100 is substantially reduced while the equivalent depth of tilling is achieved. The reduction in moment arm requires less power to obtain the same results and permits the employment of a relatively smaller power unit 14.

It has been learned that a rotational speed of 451 RPM coupled with a forward speed of 2½ m.p.h. produces an optimum soil clod size to achieve good mixing and aerobic action of bacteria. The actual bite size per revolution is approximately one inch (1"). The radius of the rotary tiller is nominally seven inches (7″) which produces a good mix of the top soil to bring the nutrients therein easily accessible to the feeder roots of the crop to be planted.

Rotating tiller 86 performs several functions. Among these are included: mulching of the soil; cutting up of any crop residue; mixing the crop residue with the soil; rendering the mixture airborne; and, discharging the airborne mixture rearwardly and away from the advancing path of points 100 and shank 94.

A curved tiller cover 102 is attached to and extends rearwardly of front hood 44. It shields and precludes an upward discharge of soil particles. The cover is also secured to framework 40 and provides an element of structural strength thereto.

A row former 106 is pivotally attached to the rear edge of cover 102 by means such as a hinge 108. The row former performs the primary function of forming the airborne soil mixture discharged by the rotary tiller into rows 30 and 32, as illustrated in FIG. 1.

The row former includes a plurality of hoods 110, the number of which is commensurate with the number of rows to be formed. Each hood includes a horizontal plate 112 extending rearwardly from hinge 102 and commensurate in width with the width of the top surface of the row to be formed. A pair of inverted generally trapezoidal plates 114 depend from opposed edges of plate 112 at an angle commensurate with the sides of the trapezoidal cross-section of the row to be formed. A further plate 116 extends laterally from the lower edge of each of plates 114 and defines the bottom surface of the trough intermediate the rows to be formed. A plurality of deflection plates 118 are disposed intermediate hoods 110 and secured to the forward edges of plates 114 and 116. These deflection plates may be vertical, or near vertical as illustrated in FIG. 2.

In operation, the airborne soil mixture discharged rearwardly from rotary tiller 86, will be directed into one of the hoods or against one of the deflection plates. That said mixture directed into the hoods will be deflected at a small angle by the hoods to form the rows; the small deflection angle results in very little abrasive wear on the plates of the hoods. The soil mixture directed against deflection plates 118 will tend to build up thereagainst. The soil will continue building up against the deflection plates until such point as the soil build up, in combination with the forward movement of the deflector plates across the soil, will cause the built up soil to flow laterally into the adjacent hoods. This lateral flow, in combination with the airborne soil mixture discharged from the rotating tiller directly into the hoods, combine to form the rows. This continuing supply of built up soil upon the deflection plates serves as a buffer against further discharged soil mixture. With this buffer very little abrasion of the deflection plates will occur.

By experimentation, it has been found that the rear bottom edge of plates 114 must slope upwardly and rearwardly at an angle approximately commensurate with the angle formed by the leading surface of the row being formed; moreover, the length of plates 114 and 112 must be sufficient to have the rear bottom edges trail the leading edge of the row to insure complete formation of the row within the row former.

Because the rearwardly discharged airborne soil mixture is simply channeled by row former 106, very little power is required to form the rows. In the prior art devices known to applicant, row forming is generally accomplished by physically raising the soil from the troughs being formed to a height commensurate with the rows being formed and such operation requires substantial power.

Row former 12, upon forming the rows and troughs, effects a seal against discharge of dust. Thus, the row former, in combination with front hood 44, end plates 48 and 50, and cover 102 form an effective sealed compartment to prevent discharge of dust as a result of operation of rippers 70 and rotating tiller 86. The hood also serves a secondary purpose of preventing discharge of particulate matter which may injure bystanders.

By the hinged attachment of the row former, it adjusts automatically to different depths of tillage. Since deflector plates 118 carry excess dirt along with a frontal build up within the hoods themselves, the row former serves as an accumulator or surging device to prevent low spots in rows.

Any surface discontinuities of farm field 28 are thereby effectively removed by the leveling effect of the row former. Where differently sized rows are to be formed, row former 106 is readily replaced by disengaging it from hinge 108 or undoing the hinge by removing the hinge pin.

Depending upon the power of the draught vehicle, the width of the implement and the type, nature and composition of the soil, auxiliary power unit 14 may be deleted. In such event, transmission 16 may be engaged with the conventional power tube off unit present in most forming draught vehicles; necessarily, some changes in gear ratios and gear type selection may have to be made. Other variations with respect to the type of hitch employed and the function of wheels 20, 22 and the support therefor may be made.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A dust free tillage implement for preparing soil ready for planting in one pass across a field, said implement comprising in combination:
   (a) a framework attachable to a draught vehicle;
   (b) a plurality of spaced apart rippers suspended from said framework and spanning across the path of said implement for fracturing the ground;
   (c) a rotary tiller for mulching the soil and discharging it airborne toward the rear of said implement, said tiller including a rotating shaft, a plurality of shanks spaced along and radial to said shaft and a point disposed at the extremity of each said shank;
   (d) means for rotatably supporting said shaft at an elevation proximate the elevation of the surface of the soil being tilled;
   (e) motive means for providing power to rotate said shaft in the direction of travel;
   (f) a row former disposed rearward of said rotary tiller for deflecting and directing the airborne soil into one of a plurality of rows and for effecting a seal between the rear of said implement and the soil, said row former including a hood for defining each row, said hood including a pair of side plates having lower edges which slope upwardly and rearwardly downstream of the leading edge of the row being formed, and a deflection plate for defining each trough intermediate adjacent rows, each of said deflection plates being oriented to build up upstream a mound of soil for buffering the impact thereagainst of the airborne soil discharged from said rotary tiller and avoiding the abrasive effect which would other wise be presented by the impact of the airborne soil thereagainst; and
   (g) shroud means disposed along the lateral sides of said implement for effecting a seal between the sides of said implement and the soil;
   whereby, said implement performs in one pass the conventional separately performed operations of mulching residue and growing vegetation, prediscing, ripping, plowing, discing, leveling and furrowing out rows.

2. The implement as set forth in claim 1 wherein said shroud means extends downwardly below the surface elevation of the soil.

3. The implement as set forth in claim 2 including a further ripper disposed proximate the leading edge of each of said shroud means.

4. The implement as set forth in claim 1 including means for restraining discharge of soil forward of said airborne soil implement.

5. The implement as set forth in claim 4 wherein said restraining means comprises a plurality of pivotally suspended deflectors.

6. The implement as set forth in claim 1 wherein said hood includes a generally horizontal plate extending rearwardly from the bottom edge of said deflection plate and interconnecting said lower edges of facing ones of said side plates of adjacent ones of said hoods to form the bottom of the trough intermediate adjacent rows.

7. The implement as set forth in claim 6 wherein said row former is pivotally attached to said framework.

8. The implement as set forth in claim 1 wherein each of said rippers includes a shoe at the bottom extremity thereof and detachably attached points engageable with said shoe.

9. The implement as set forth in claim 8 wherein each said shoe includes a recess and each of said points includes an end retainingly disposable within said recess.

10. The implement as set forth in claim 9 wherein said recess is tapered and each of said points is tapered at each end for engagement of either end with said tapered recess, whereby the life of said points is doubled.

11. The implement as set forth in claim 1 wherein each said shank of said rotary tiller includes a shoe for disengagably engaging said point.

12. The implement as set forth in claim 11 wherein each of said shoes includes a tapered recess and wherein said points are tapered at each end for alternate insertion in said tapered shoe.

13. The implement as set forth in claim 12 wherein a length of the leading edge of each of said shank is at a trailing angle to prevent vegetation residue adjacent said shaft.

14. The implement as set forth in claim 1 wherein said motive means comprises power unit means mounted upon said implement independent of the draught vehicle.

15. The implement as set forth in claim 1 including means for attaching other trailing implements, such as fertilizers and/or planters to complete all soil conditioning and planting operations of row crops in one pass.

* * * * *